United States Patent [19]
Vitale et al.

[11] Patent Number: 5,623,616
[45] Date of Patent: Apr. 22, 1997

[54] FLOATING POINT OPERATON THROUGHPUT CONTROL

[75] Inventors: Philip L. Vitale, Santa Clara, Calif.; William L. Walker, Fort Collins, Colo.

[73] Assignee: Hewlett-Packard Company, Palo Alto, Calif.

[21] Appl. No.: 327,130

[22] Filed: Oct. 20, 1994

Related U.S. Application Data

[63] Continuation of Ser. No. 96,584, Jul. 22, 1993, abandoned.

[51] Int. Cl.$^6$ .................................................. G06F 9/30
[52] U.S. Cl. .................. 395/563; 364/263.3; 364/946.9
[58] Field of Search ................................ 395/375, 775, 395/800

[56] References Cited

U.S. PATENT DOCUMENTS 4,987,534  1/1991  Sekiguchi ................................ 395/375

OTHER PUBLICATIONS

Donald Steiss, et al., *A 65 MHz Floating–Point Coprocessor for a RISC Processor*, ISSCCY1/Session 5/Microprocessors/Paper TA 5.3, 1991 IEEE International Solid–State Circuits Conference, p. 94.

Eric DeLano, et al., *A High Speed Superscalar PA–RISC Processor*, IEEE COMPCON, 1992, (0–8186–2655–0/92) pp. 116–120.

*Primary Examiner*—David Y. Eng

[57] ABSTRACT

A circuit and method degrades throughput of floating point operations within a computing system. At the time of manufacture a preprogrammed value is stored. This may be done, for example, using fusible links, separate metal layers, internal bonding pad selection, EPROM/OTP memory cells, ion milling, laser evaporation and external programming pins. When a floating point processor processes a floating point operation, operation of a main processor is delayed an amount corresponding to the preprogrammed value. For example, when the floating point processor processes a floating point operation, a counter begins to count. Operation of the main processor is delayed until the counter has counted to a number equal to the preprogrammed value. Upon the counter completing counting to a number equal to the preprogrammed value, normal operation of the main processor is resumed.

18 Claims, 3 Drawing Sheets

FLOATING POINT OPERATON THROUGHPUT CONTROL

CROSS REFERENCE TO RELATED APPLICATION

This application is a continuation of application Ser. No. 08/096,584, filed Jul. 22, 1993, now abandoned.

BACKGROUND

The present invention concerns the control of throughput performance of floating point units.

Because of the complexity of mathematical calculations on non-integers, many computer systems have special processors devoted to making floating point calculations. Typically in such a computer system, when an instruction calls for a floating point operation, a floating point unit will perform the operation and present the result to the system (main) processor.

There are various cases where it is desirable to intentionally degrade performance of computer systems. For example, in order to satisfy certain U.S. export requirements for certain computer systems, it is necessary for the computer systems to perform below certain set criteria. One performance criteria used is the speed at which floating point calculations are performed.

It is desirable, therefore, under certain situations to be able to slow the operation of floating point units. In most prior art systems, a floating point co-processor has existed on a separate chip than the central processor. See, for example, Donald Steiss, et al., *A 65 MHz Floating-Point Coprocessor for a RISC Processor,* ISSCCY1/Session 5/Microprocessors/Paper TA 5.3, 1991 IEEE International Solid-State Circuits Conference, p. 94. In such a case, several options exist to limit computer system performance. For example, in many cases, the floating point co-processor can be eliminated entirely. Alternately, the clock signals or control signals to the floating point co-processor can be slowed in order to degrade the throughput of floating point operations.

In some more recently developed computer systems, however, floating point capability is incorporated on the same chip that houses the main processor. See for example, Eric DeLano, et al., *A High Speed Superscalar PA-RISC. Processor,* IEEE COMPCON, 1992, (0-8186-2655-0/92) pp. 116–120. In such a computer system, prior methods to slow operation of the computer system may be inconvenient, not feasible, or expensive. For example, elimination of the floating point unit from certain chips may entail significant special design and manufacturing costs. Slowing the clock to the chip in order to slow floating point operation may seriously degrade performance in non-floating point operations.

SUMMARY OF THE INVENTION

In accordance with the preferred embodiment of the present invention, a circuit and method for degrading operation of a computing system having a floating point processor coupled to the main processor is presented. At the time of manufacture, a preprogrammed value is stored. This may be done, for example, using fusible links. Alternately, separate metal layers, internal bonding pad selection, EPROM/OTP memory cells, ion milling, laser evaporation or external programming pins may be used to store the preprogram value. When the floating point processor processes a floating point operation, operation of the computing system is delayed an amount corresponding to the preprogrammed value.

For example, a counter may be used. When the floating point processor processes a floating point operation, the counter begins to count. Operation of the computing system is delayed until the counter has counted to a number equal to the preprogrammed value. Upon the counter completing counting to a number equal to the preprogrammed value, normal operation of the computing system is resumed. In the preferred embodiment, the main processor includes a pipeline with multiple stages. In alternate embodiments of the present invention, a state machine or other device to delay the computing system may be substituted for the counter.

The present invention provides a way to degrade performance of floating point operations with a minimum of adverse effect on computer system performance. Additionally, the amount of degradation may be easily programmed at the time of manufacture. The present invention also has the advantage of allowing the manufacture of computer systems with several different performance capabilities with only the most minor adjustments in manufacturing.

DESCRIPTION OF THE PREFERRED EMBODIMENT

Figure 1:
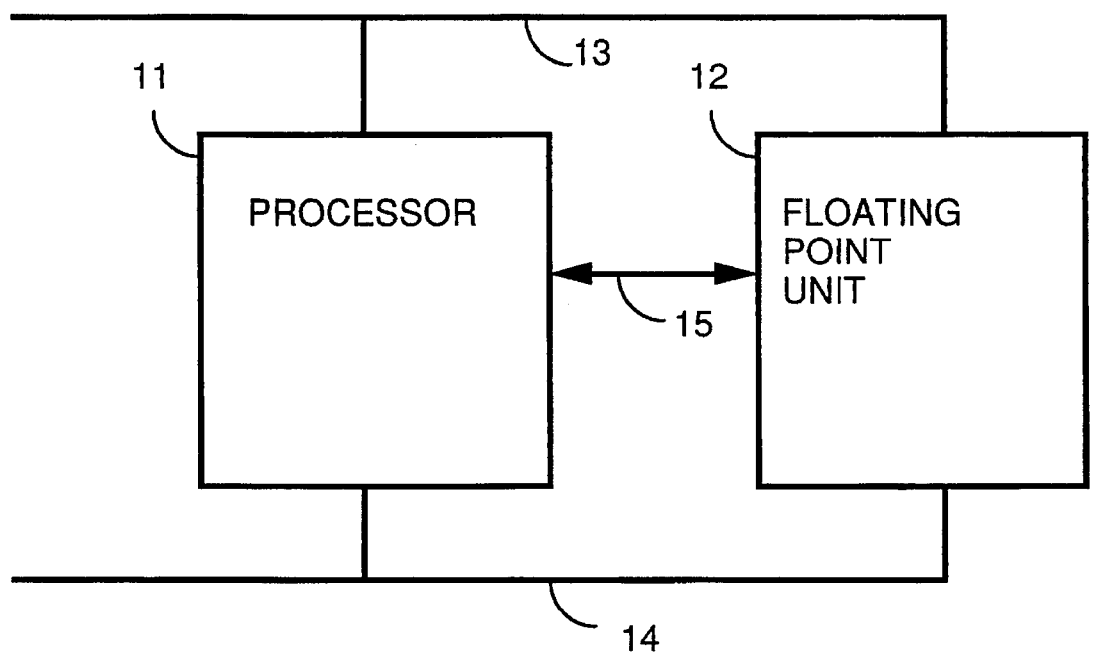
FIG. 1 shows a logical block diagram of a main processor connected to a floating point unit, in accordance with the preferred embodiment of the present invention.

FIG. 1 shows a logical block diagram of a computing system which includes a main processor 11 and a floating point unit 12, in accordance with the preferred embodiment of the present invention. Both main processor 11 and floating point unit 12 are connected to an instruction bus 13 and a data bus 14. In addition, processor 11 and floating point unit 15 exchange control signals through lines 15.

Figure 2:
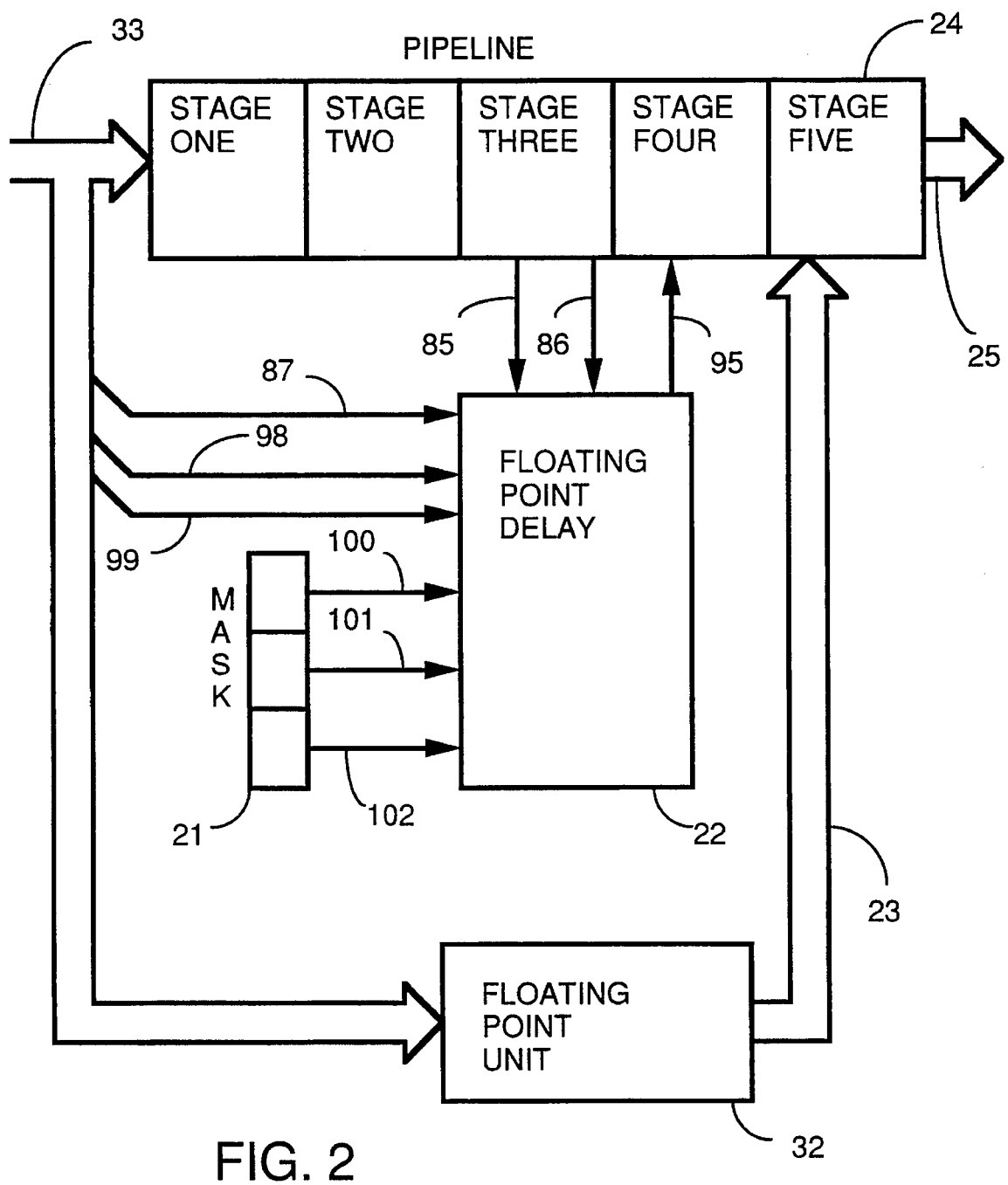
FIG. 2 shows a logical block diagram illustrating the interaction of a floating point delay circuit with a floating point unit and with a pipeline within a central processor in accordance with the preferred embodiment of the present invention.

FIG. 2 shows a logical block diagram illustrating the interaction of a floating point delay circuit 22 with floating point unit 32 and with a pipeline 24. In the preferred embodiment, pipeline 24 is a five stage pipeline. In a first stage, instructions are fetched from data and instruction stream 33. In a second stage, the instructions are decoded. In a third and fourth stage, the operations specified by the instructions are executed. For example, integer operations handled with the central processor may be completed within the third stage. Floating point unit 32 may utilize both the third stage and the fourth stage in generation of results from floating point operations. In the fifth stage, results are written into result registers. Results from floating point operations are received from floating point unit 32 through a data stream 23.

Floating point delay circuit 22 is used to delay operation of pipeline 24 during the execution of a floating point operation, in order to degrade throughput of the computing system. For example, in the preferred embodiment, a mask 21 is used to select the amount of delay which occurs during a floating point operation.

In the preferred embodiment of the present invention, mask 21 is constructed using fusible links. The fuses are three wires within the integrated circuit containing floating point delay circuit 22, floating point unit 32 and pipeline 24. When all the wires are uncut, the value within mask 21 is $000_2$. Any combination of the three wires can be cut, for example using laser or focused ion beam (FIB), to place a non-zero value within mask 21. The value within mask 21 indicates the number of cycles to delay operation of pipeline 24 when a floating point instruction is executed. In the preferred embodiment, the number of inserted delay cycles varies from two to eight depending on the value held by mask 21.

While in the preferred embodiment of the present invention fusible links are used, any number of programming methods can be used to implement an equivalent to mask 21. For example, separate metal layers, internal bonding pad selection, EPROM/OTP memory cells, ion milling, laser evaporation and external programming pins may all be used to program values to determine a delay length.

Mask 21 delivers to floating point delay 22, a high order bit FPMASK[0] on a line 100, a middle bit FPMASK[1] on a line 101 and a low order bit FPMASK[2] on a line 102. In addition, floating point delay 22 receives from data and instruction stream 33 an active low processor reset bit (PRESETDL) on a line 87, a system clock signal (CK2N) on a line 98 and a system clock signal (CK1N) on a line 99. System clock signal (CK2N) on line 98 is an inverted copy of system clock signal (CK1N) on line 99. Also, floating point delay 22 receives from pipeline 24 a signal (CPSTEPIH) on a line 85 and a signal (CPFPCE_IN) on a line 86. Signal (CPSTEPIH) on line 85 indicates pipeline 24 is in transition between stages. Signal (CPFPCE_IN) on line 86 indicates a floating point instruction is being processed in the third stage of pipeline 24.

Floating point delay 22 generates a signal (FPBUSY) on a line 95. Signal FPBUSY on line 95 is forwarded to pipeline 24. When the FPBUSY signal is not asserted (i.e., it is at logic 0), pipeline 24 continues normal operation. When the FPBUSY signal is asserted (i.e., it is at logic 1) pipeline 24 ceases operation until the FPBUSY signal is no longer asserted.

Floating point delay 22 operates as follows. When the value in mask 21 is $000_2$, floating point delay circuit 22 continually keeps the FPBUSY signal at logic 0 allowing pipeline 24 to continue normal operation. If mask 21 is at a non-zero value, floating point delay circuit 22 continually keeps the FPBUSY signal at logic 0 until both signal (CPSTEPIH) on line 85 and signal (CPFPCE_IN) on line 86 are asserted. The assertion of both these signals indicates a floating point instruction is being processed in the third stage of pipeline 24 and that pipeline 24 is in transition between stages. At this time floating point delay circuit 22 asserts the FPBUSY signal to logic 1 preventing pipeline 24 from continuing operation. After the first clock cycle in which floating point delay circuit 22 detects both signal (CPSTEPIH) on line 85 and signal (CPFPCE_IN) on line 86 are asserted, floating point delay circuit 22 begins to count clock cycles until the number held in mask 21 is reached. When floating point delay circuit 22 has counted to the number held in mask 21, floating point delay circuit 22 returns the FPBUSY signal to logic 0 allowing pipeline 24 to continue normal operation.

Figure 3:
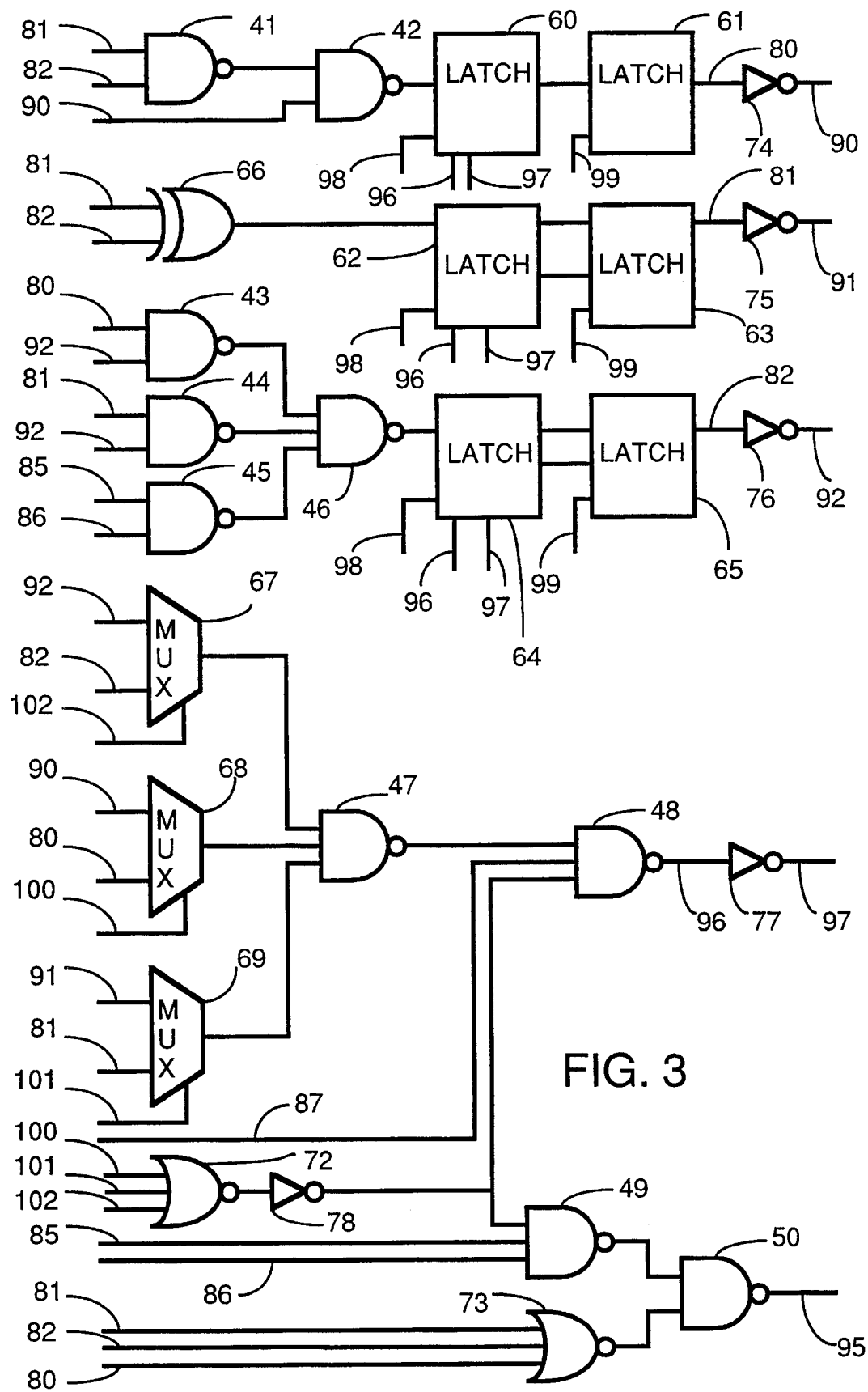
FIG. 3 shows a schematic of circuitry which implements the floating point delay circuit in FIG. 2 in accordance with the preferred embodiment of the present invention.

FIG. 3 shows a circuit schematic of floating point delay circuit 22 in accordance with the preferred embodiment of the present invention. A logic NAND gate 42, a logic NAND gate 42, a latch 60 and a latch 61 are used to generate a high order counter bit FP[0] on a line 80. Latch 60 is timed using system clock signal (CK2N) on line 98. Latch 60 is reset using a Reset signal on a line 96 and a Reset_L signal on a line 97. Reset_L signal on line 97 is the inverse of Reset signal on line 96. Latch 61 is timed using system clock signal (CK1N) on line 99. An inverter 74 is used to invert high order counter bit FP[0] on line 80 to produce an inverted high order counter bit FPL[0] on a line 90.

A logic XOR gate 66, a latch 62 and a latch 63 are used to generate a middle counter bit FP[1] on a line 81. Latch 62 is timed using system clock signal (CK2N) on line 98. Latch 62 is reset using the Reset signal on line 96 and the Reset_L signal on line 97. Latch 63 is timed using system clock signal (CK1N) on line 99. An inverter 75 is used to invert middle counter bit FP[1] on line 81 to produce an inverted middle counter bit FPL[1] on a line 91.

A logic NAND gate 43, a logic NAND gate 44, a logic NAND gate 45, a logic NAND gate 46, a latch 64 and a latch 65 are used to generate a low order counter bit FP[2] on a line 82. Latch 64 is timed using system clock signal (CK2N) on line 98. Latch 64 is reset using the Reset signal on line 96 and the Reset_L signal on line 97. Latch 65 is timed using system clock signal (CK1N) on line 99. An inverter 76 is used to invert low order counter bit FP[2] on line 82 to produce an inverted low order counter bit FPL[2] on a line 92.

An inverter 77 produces the Reset_L signal on line 97 by inverting the Reset signal on line 96. A multiplexor 67, a multiplexor 68, a multiplexor 69, a logic NAND gate 48, a logic NOR gate 72 and an inverter 72 are used to produce the Reset signal on line 96.

Multiplexor 67, multiplexor 68 and a multiplexor 69 operate as follows. When high order bit FPMASK[0] on line 100 is at logic 0, inverted high order counter bit FPL[0] on line 90 is connected through to an input of logic NAND gate 48. When high order bit FPMASK[0] on line 100 is at logic 1, high order counter bit FP[0] on line 80 is connected through to the input of logic NAND gate 48. When middle bit FPMASK[1] on line 101 is at logic 0, inverted middle counter bit FPL[1] on line 91 is connected through to an input of logic NAND gate 48. When middle bit FPMASK[1] on line 101 is at logic 1, middle counter bit FP[1] on line 81 is connected through to the input of logic NAND gate 48. When low order bit FPMASK[2] on line 102 is at logic 0, inverted low order counter bit FPL[2] on line 92 is connected through to an input of logic NAND gate 48. When low order bit FPMASK[2] on line 102 is at logic 1, low order counter bit FP[2] on line 82 is connected through to the input of logic NAND gate 48.

As may be understood by the logic, the Reset signal on line 96 is activated when active low processor reset bit (PRESETDL) on line 87 is at logic 0. The Reset signal on line 96 is also activated whenever high order bit FPMASK[0] on line 100, middle bit FPMASK[1] on line 101 and low order bit FPMASK[2] on line 102 are all at logic 0. The Reset signal on line 96 is also activated when the values of high order counter bit FP[0] on line 80, middle counter bit FP[1] on line 81 and low order counter bit FP[2] on line 82 are respectively equal to the values on high order bit FPMASK[0] on line 100, middle bit FPMASK[1] on line 101 and low order bit FPMASK[2] on line 102.

A logic NAND gate 49, a logic NAND gate 50, a logic NOR gate 73, logic NOR gate 72 and inverter 72 are used to produce the signal (FPBUSY) on line 95. As may be understood by the logic, the signal (FPBUSY) on line 95 is activated whenever any of the values, high order counter bit FP[0] on line 80, middle counter bit FP[1] on line 81 or low order counter bit FP[2] on line 82, is at logic 1. Additionally, the signal (FPBUSY) on line 95 is activated whenever both signal (CPSTEPIH) on line 85 and signal (CPFPCE_IN) on line 86 are asserted at the same time as any of the values, high order bit FPMASK[0] on line 100, middle bit FPMASK[1] on line 101 or low order bit FPMASK[2] on line 102, is at logic 1.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A computing system comprising:

a main processor;

a floating point processor, coupled to the main processor, which processes floating point operations;

mask means for permanently holding a first value, the mask means permanently storing the value utilizing a storage technology from the group consisting of fusible links, internal bonding pad selection, read-only memory cells, separate metal layers, ion milling, laser evaporation and external programming pins; and, a floating point delay circuit coupled to the main processor, the mask means and the floating point processor, the floating point delay circuit degrading performance of the computing system when the floating point processor processes a floating point operation, the floating point delay circuit degrading performance of the computing system by preventing the main processor from executing instructions during a delay period, a length of the delay period being dependent upon the first value;

wherein the floating point processor and the main processor operate in synchronization when there is no delay period so that the introduction of the delay period results in degrading performance of the computing system.

2. A computing system as in claim 1 wherein the mask means comprises a plurality of fusible links, the first value being determined by which fusible links are melted.

3. A computing system as in claim 1 wherein the floating point delay circuit comprises a counter, the counter beginning to count when the floating point processor processes a floating point operation and the floating point delay circuit preventing execution of instructions by the main processor until the counter has counted to a number equal to the first value.

4. A computing system as in claim 1 wherein the main processor includes a pipeline with multiple stages.

5. A computing system as in claim 4 wherein the floating point delay circuit comprises a counter, the counter beginning to count when the floating point processor processes a floating point operation and the floating point delay circuit halting operation of the pipeline until the counter has counted to a number equal to the first value.

6. A computing system as in claim 5, wherein the floating point delay circuit delays operation of the pipeline by asserting a busy signal, the pipeline ceasing operation until the busy signal is no longer asserted.

7. A computer implemented method for degrading operation of a computing system having a main processor and a floating point processor coupled to the main processor, the computer implemented method comprising the steps of:

(a) permanently storing in the computing system a preprogrammed value, wherein the preprogrammed value is stored utilizing a storage technology from the group consisting of fusible links, internal bonding pad selection, read-only memory cells, separate metal layers, ion milling, laser evaporation and external programming pins;

(b) when the floating point processor processes a floating point operation, degrading performance of the computing system by preventing the main processor from executing instructions during a delay period, a length of the delay period corresponding to the preprogrammed value; wherein the floating point processor and the main processor operate in synchronization when there is no delay period so that the introduction of the delay period results in degrading performance of the computing system.

8. A computer implemented method as in claim 7 wherein in step (a) the preprogrammed value is stored in a plurality of fusible links, the preprogram_med value being determined by which fusible links are melted.

9. A computer implemented method as in claim 7 wherein step (b) comprises the substeps of:

(b.1) when the floating point processor processes a floating point operation, beginning to count on a counter;

(b.2) preventing the main processor from executing instructions until the counter has counted to a number equal to the preprogrammed value; and, (b.3) upon the counter completing counting to a number equal to the preprogrammed value, resuming normal operation of the computing system.

10. A computer implemented method as in claim 7 wherein the main processor includes a pipeline with multiple stages.

11. A computer implemented method as in claim 10 wherein step (b) comprises the substeps of:

(b.1) when the floating point processor processes a floating point operation, beginning to count on a counter;

(b.2) halting operation of the pipeline until the counter has counted to a number equal to the preprogrammed value; and, (b.3) upon the counter completing counting to a number equal to the preprogrammed value, resuming normal operation of the pipeline.

12. A computer implemented method as in claim 11, wherein substep (b.2) includes asserting a busy signal, the pipeline ceasing operation while the busy signal is asserted.

13. In a computing system having a first processor and a floating point processor, a circuit for degrading performance of the computing system, the circuit comprising;

value holding means for permanently holding a preprogrammed value, wherein the value holding means permanently stores the preprogrammed value utilizing a storage technology from the group consisting of fusible links, internal bonding pad selection, read-only memory cells, separate metal layers, ion milling, laser evaporation and external programming pins; and, a floating point delay circuit coupled to the value holding means, the floating point delay circuit degrading operation of the computing system by preventing the first processor from executing instructions for a delay period when the floating point processor processes a floating point operation, a length of the delay period being based upon the preprogrammed value; wherein the floating point processor and the first processor operate in synchronization when there is no delay period so that the introduction of the delay period results in degrading performance of the computing system.

14. A computing system as in claim 13 wherein the value holding means comprises a plurality of fusible links.

15. A computing system as in claim 13 wherein the floating point delay circuit comprises a counter, the counter beginning to count when the floating point processor processes a floating point operation and the floating point delay circuit delaying execution of instructions by the first processor until the counter has counted to a number equal to the first value.

16. A computing system as in claim 13 wherein the computing system includes a pipeline with multiple stages.

17. A computing system as in claim 16 wherein the floating point delay circuit comprises a counter, the counter beginning to count when the floating point processor processes a floating point operation and the floating point delay circuit halting operation of the pipeline until the counter has counted to a number equal to the first value.

18. A computing system as in claim 17, wherein the floating point delay circuit delays operation of the pipeline by asserting a busy signal, the pipeline ceasing operation until the busy signal is no longer asserted.

* * * * *

UNITED STATES PATENT AND TRADEMARK OFFICE
CERTIFICATE OF CORRECTION

PATENT NO.    : 5,623,616
DATED         : April 22, 1997
INVENTOR(S)   : Vitale et al.

It is certified that error appears in the above-identified patent and that said Letters Patent is hereby corrected as shown below:

Column 6,
Line 22, delete "preprogram_med" and insert therefor -- preprogrammed --

Signed and Sealed this

Fifteenth Day of April, 2003

JAMES E. ROGAN
*Director of the United States Patent and Trademark Office*